United States Patent [19]

Dowdy et al.

[11] 4,389,568
[45] Jun. 21, 1983

[54] METHOD FOR MONITORING IRRADIATED NUCLEAR FUEL USING CERENKOV RADIATION

[75] Inventors: Edward J. Dowdy; Nicholas Nicholson; John T. Caldwell, all of Los Alamos, N. Mex.

[73] Assignee: The United States of America as represented by the United States Department of Energy, Washington, D.C.

[21] Appl. No.: 151,870

[22] Filed: May 21, 1980

[51] Int. Cl.$^3$ ............................................. G01T 1/22
[52] U.S. Cl. ................................ 250/362; 250/361 R; 250/391; 376/257
[58] Field of Search ........... 250/362, 459, 336, 361 R, 250/358 R; 176/19 R; 250/390, 391, 392; 376/257

[56] References Cited

U.S. PATENT DOCUMENTS

| | | | |
|---|---|---|---|
| 2,954,473 | 9/1960 | Hoover et al. | 250/362 |
| 3,560,741 | 2/1971 | Strindehag | 250/361 R |
| 3,600,578 | 8/1971 | Porges et al. | 176/19 R |
| 3,717,765 | 2/1973 | Hiller | 250/390 |
| 3,786,256 | 1/1974 | Untermyer . | |
| 3,984,332 | 10/1976 | Nelson et al. | 250/361 R |
| 4,005,292 | 1/1977 | Oesterlin et al. | 250/364 |
| 4,229,654 | 10/1980 | Arya et al. | 250/362 |

OTHER PUBLICATIONS

McDonnagle, "Non-Destructive Methods for Determining Burn-Up in Nuclear Fuel," Proc. Sym. on Nuclear Materials Management, IAEA, Vienna, Aug. 30–Sep. 3, 1965, pp. 851–866.
R. Hesp, "The Feasibility of Using a Liquid-filled Cerenkov Counter for Gamma-ray Counting of Large Samples," Phys. Med. Biol., 23 (3), May 1978, pp. 438–445.

*Primary Examiner*—Alfred E. Smith
*Assistant Examiner*—Carolyn E. Fields

[57] ABSTRACT

A method is provided for monitoring irradiated nuclear fuel inventories located in a water-filled storage pond wherein the intensity of the Cerenkov radiation emitted from the water in the vicinity of the nuclear fuel is measured. This intensity is then compared with the expected intensity for nuclear fuel having a corresponding degree of irradiation exposure and time period after removal from a reactor core. Where the nuclear fuel inventory is located in an assembly having fuel pins or rods with intervening voids, the Cerenkov light intensity measurement is taken at selected bright spots corresponding to the water-filled interstices of the assembly in the water storage, the water-filled interstices acting as Cerenkov light channels so as to reduce cross-talk. On-line digital analysis of an analog video signal is possible, or video tapes may be used for later measurement using a video editor and an electrometer. Direct measurement of the Cerenkov radiation intensity also is possible using spot photometers pointed at the assembly.

8 Claims, 2 Drawing Figures

METHOD FOR MONITORING IRRADIATED NUCLEAR FUEL USING CERENKOV RADIATION

BACKGROUND OF THE INVENTION

This invention is a result of a contract with the Department of Energy (Contract No. W-7405-ENG-36).

Exposed research and power reactor fuel assemblies contain significant quantities of fissile material, both unburned $U^{235}$ and $Pu^{239}$ produced from the fertile $U^{238}$ during exposure. Consequently, surveillance of these fuel assemblies is imperative if attempts to divert special nuclear materials are to be discovered. Storage of exposed fuel assemblies in fuel storage ponds for a cooling time is a requirement in any nuclear fuel cycle, and permanent storage may be the final solution in those countries that have no provision for fuel reprocessing. In order to monitor the fuel assemblies, an inspector must be able to detect discrepancies between the declared spent fuel assembly exposure and the actual exposure, and to discover irradiated fuel removal.

A number of methods have been disclosed in the prior art for assaying the quantities content or proportions of various fissile isotopes of a fuel sample. For example, in U.S. Pat. No. 3,786,256 to Untermeyer, nuclear fuel rods are irradiated with neutrons so that the fuel emits fission neutrons and gammas which are detected in a coincidence counting system. A method for concurrently counting a plurality of radioactive samples has been disclosed in U.S. Pat. No. 4,005,292 to Oesterlin et al. In this patent, the plurality of samples are placed in a two dimensional matrix proximate to a centralization transducing means which generates signals indicative of the quanta and position of radiation detected.

In order to effectively monitor the nuclear fuel located in a storage pond, a number of practical considerations must be met. In the first place, due to the large volume of nuclear fuel which is located in a storage pond, it is preferable that at least the majority of this fuel be monitored in contrast to providing spot checks of individual elements. In addition, it is important for any technique that it be easily implemented, that the measured data be simple to interpret, and that the technique involve minimal impact in the routine schedule of the facility operator. All of the possible techniques known to applicants including those mentioned above suffer from one or more drawbacks as regards these practical considerations. In particular, all of these techniques require the placement of sensors near the nuclear fuel, i.e., the introduction of equipment into the storage pond.

As discussed below, the present invention involves measurement of Cerenkov radiation. Cerenkov radiation detectors have been disclosed in the prior art. For example, in U.S. Pat. No. 2,954,473 to Hoover et al. and U.S. Pat. No. 3,560,741 to Strindehag a method and apparatus are disclosed for measuring the Cerenkov radiation generated in a liquid to detect the presence of fission products in the liquid. A method and apparatus for mapping a radiation field or other applications using Cerenkov radiation is disclosed in U.S. Pat. No. 3,984,332 to Nelson et al.

SUMMARY OF THE INVENTION

This invention relates generally to a method of performing consistency checks upon the irradiated nuclear fuel inventories located in a water-filled storage pond. The confirmation of the fuel inventory is achieved by first measuring the intensity of Cerenkov radiation emitted from the water surrounding the nuclear fuel and then comparing this measured intensity with the expected intensity for nuclear fuel having a corresponding degree of exposure and time period after removal from a reactor core. If the two values are approximately the same, the inventory is confirmed. Where the nuclear fuel is located in assemblies having fuel pins and coolant channels, the Cerenkov light intensity measurement is taken at selected bright spots corresponding to the coolant channels of the assembly.

Among other advantages of the present invention is that the method is easily implemented, the measurement data is simple to interpret, the method can be carried out rapidly, and there is minimal disruption of normal operations in making this measurement.

Other features and advantages of the present invention are stated in and/or are apparent from the detailed description of the embodiments of the invention found hereinbelow.

DETAILED DESCRIPTION OF THE PREFERRED EMBODIMENTS

Electromagnetic Cerenkov radiation is emitted whenever a charged particle passes through a medium with a velocity exceeding the phase velocity of light in that medium. In water, the phase velocity of light is about 75% of the value in a vacuum. Any electron passing through water and having a kinetic energy greater than approximately 0.26 MeV is thus a source of Cerenkov radiation. Irradiated fuel assemblies are a prolific source of beta and gamma rays and neutrons, and all three of these types of emissions result in Cerenkov light production.

The most significant production of Cerenkov light is from high energy fission fragment decay gamma rays that penetrate the fuel cladding, generating high energy electrons in the cladding and the surrounding water. Neutrons may undergo $H(n,\lambda)$ reaction in the water and produce Cerenkov light through interaction of the 2.23 MeV capture gamma rays with the water.

Calculations have been performed which show that the Cerenkov light intensity is a function of exposure time in the reactor core and cooling time (the time period after removal from the core). Immediately after withdrawal from the reactor core, there appears to be little difference between high and low exposure material. However, at longer times after withdrawal, when nuclear fuel inventory verification also must be made, there is a nearly linear dependence on burn-up. Thus, the information attainable from a Cerenkov light intensity measurement is burn-up related, in that the absolute Cerenkov light level and its decay with time are related to burn-up. Thus, so long as the intensity of the Cerenkov light is accurately determined in the measurement, it would be difficult for a diversion of the fuel to occur such as by a substitution of either dummy fuel assemblies or by incorrectly stating burn-up.

Since water has a very small attenuation coefficient for visible and near ultra-violet light, the Cerenkov light measurements can be made from above the surface of the storage pond. For this reason, the introduction of equipment into the pond is not necessary. Conveniently, the equipment to measure the Cerenkov radiation may be clamped to the spent fuel storage pond bridge and this movable bridge used to transport the equipment above the storage racks. Lightweight versions of the equipment can be hand carried.

For the standard vertical storage of light water reactor nuclear fuel assemblies, the coolant channels and the upper mechanical structure of the assembly serve as Cerenkov light channels. This allows for the sampling of the Cerenkov radiation intensity much deeper than the top of the fuel assembly. Due to the action of these light channels, the Cerenkov light intensity measurement taken at the light channel is thus considered to be less susceptible to cross-talk among adjacent assemblies than are measurements of nuclear radiation made at the top of assemblies.

Figure 1:
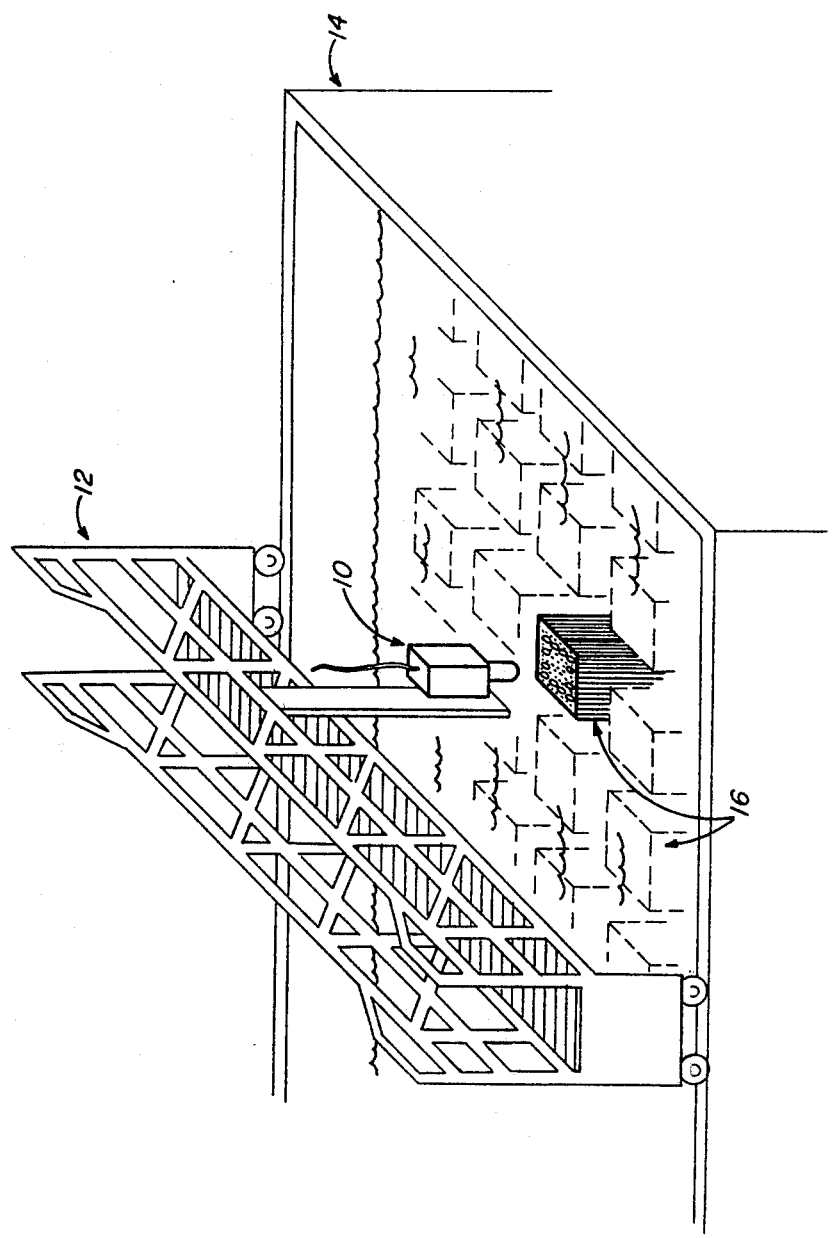
FIG. 1 is a schematic illustration of how the preferred embodiment of the method of the invention is practiced to verify an inventory of irradiated nuclear fuel located in a water-filled storage pond.

The preferred method of confirming irradiated nuclear fuel inventories located in a water-filled storage pond is as illustrated in FIG. 1 and further described herein. First, the Cerenkov light intensity measuring instrument is located above the fuel inventories. Conveniently, this can be done by attaching the instrument to the movable bridge located over the surface of the water. Next, the intensity of the Cerenkov radiation emitted from the water surrounding the nuclear fuel is measured with the instrument. For best results, deep sampling of the fission products of Cerenkov radiation is accomplished by detecting the Cerenkov radiation coming from deep within the coolant channels. To accomplish this, the optical axis of the measuring instrument is aligned with the axis of each assembly. After measuring the intensity of the Cerenkov radiation emitted from the water surrounding the nuclear fuel, this value is compared with the expected intensity of Cerenkov radiation produced in the water surrounding nuclear fuel having a corresponding degree of exposure and period after removal from a reactor core. The expected intensity can be estimated from the fission products which give rise to the Cerenkov radiation for each time the nuclear fuel is checked. The expected measurement value can also be estimated by referring to the previous measurement of the same nuclear fuel inventory taken at an earlier time and extrapolating this value to the present measurement value. If the present value and the expected value are approximately equal, then the inventory of the nuclear fuel has been confirmed.

Figure 2:
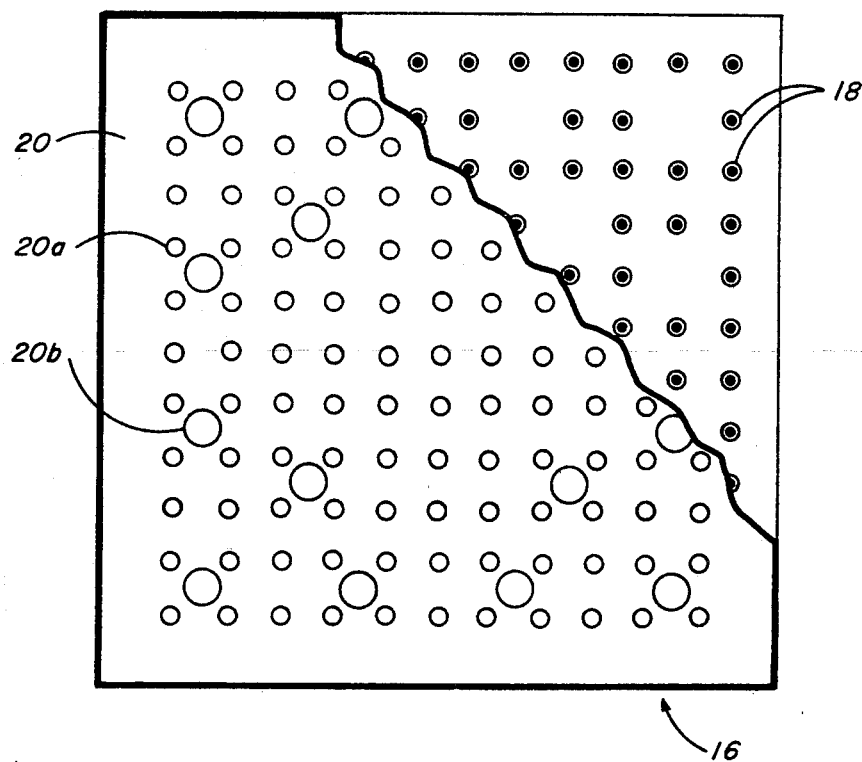
FIG. 2 is a schematic plan view of a nuclear fuel assembly submerged in a storage pond.

FIG. 2 shows a nuclear fuel assembly 16 in plan view, as seen in cross-section from above the surface of the storage pond 14. The fuel assembly 16 includes an array of vertically oriented nuclear fuel rods 18 which are spaced apart from one another. Between the fuel rods 18 are coolant channels 22. Cerenkov radiation is generated in the water surrounding the fuel rods 18 and, more specifically, in the coolant channels 22. As noted above, the method of the invention is preferably and advantageously practiced by orienting the measuring instrument so that its optical axis is parallel to the vertical axis of the fuel assembly 16 and the fuel rods 18.

In most instances, the Cerenkov light glow will not be visible to the unaided eye. For this reason, electronic light amplification is necessary with the measuring instrument in order to measure the low light levels.

The method of the present invention has been tested experimentally. In the initial tests, images of the fuel assemblies used were recorded on video tape for subsequent off-line analysis. On-line digital analysis of the analog video signals is also possible with commercially available hardware, such as the VP-8 Image Analyser offered by Interpretation Systems, Inc. With the off-line analysis used in the testing referred to, the video tapes were replayed and individual frames were grabbed and stored on a video disk. Each selected single frame on the disk was displayed in a conventional U.S. television format with a cathode ray tube with raster address being provided through the use of XY cross hairs. The raster address size was a single pixel (picture element). An associated electrometer indicated the electron current forming the intersection pixel that is directly proportional to the pixel brightness. The brightness of pixels representing coolant channels was determined in this way. To obtain a relative real coolant channel image brightness from the measured pixel brightness, the camera lens aperture size variable was removed by normalizing all brightness to a common f/stop value. The correspondence between electrometer readings and pixel brightness was determined by generating a linear gray scale on the video tape and examining the video image of the gray scale. A comparison of the calculated intensity values and the measured intensity values showed that the Cerenkov intensity variation with exposure and cooling time is calculable.

Measurements of the Cerenkov light intensities have been made by applicants using a number of techniques. The imaging instruments used for this purpose included: a high gain spot photometer; a silicon intensified target video camera; a hard film camera which incorporated a microchannel plate image intensifier; and a standard hard film camera with ultra-violet transmitting lenses. For the video tape records, quantification of the Cerenkov intensity was achieved by photometric measurements of selected bright spots on the recorded images corresponding to the coolant channels of the assemblies. Using a simple computational model of the Cerenkov light production process, a reasonable agreement over a dynamic range of three decades was found.

The measurements taken by the applicants were accomplished without moving the storage assemblies from their resident locations. The precision, reproducibility, rapidity, and nonobtrusiveness of these measurements make the Cerenkov light technique ideal for systematic confirmation of irradiated nuclear fuel inventories in large fractions of (or entire) storage pond inventories.

Although the invention has been described in detail with respect to exemplary embodiments thereof, it will be understood by those of ordinary skill in the art that variations and modifications can be effected in these embodiments within the scope and spirit of the invention. For example, the Cerenkov light measurement technique may also be used to obtain radiation profile maps of individual irradiated assemblies, again in a rapid and unobtrusive manner.

What is claimed is:

1. A method of confirming irradiated nuclear fuel inventories located in a water-filled storage pond comprising the steps of:

locating a Cerenkov radiation receiving instrument above the surface of said pond and orienting said instrument such that its optical axis is aligned with the axis of a nuclear fuel assembly;

measuring the intensity of the Cerenkov radiation emitted from the water adjacent the fuel assembly; and comparing the measured intensity with the expected intensity for nuclear fuel having a corresponding degree of exposure in a reactor core and time period after removal from the reactor core.

2. A method of confirming nuclear fuel inventories as claimed in claim 1, wherein the nuclear fuel is located in assemblies having coolant channels and the Cerenkov light intensity measurement is taken at selected bright spots corresponding to the coolant channels of the assembly.

3. A method of confirming nuclear fuel inventories as claimed in claim 1, further including the step of:

electronically amplifying the Cerenkov light received by the instrument before the light intensity is measured.

4. A method of confirming nuclear fuel inventories as claimed in claim 1, wherein the intensity of the Cerenkov radiation is measured with a high gain spot photometer.

5. A method of confirming nuclear fuel inventories as claimed in claim 1, wherein the Cerenkov light intensity is digitally analyzed on-line using an analog video signal from a low light level television camera.

6. A method of confirming nuclear fuel inventories as claimed in claim 1, wherein the Cerenkov light intensity is measured off-line using video tape and a low light level television camera.

7. A method of confirming nuclear fuel inventories as claimed in claim 1, wherein the intensity of the Cerenkov radiation is measured with a hard film camera incorporating a micro channel plate image intensifier.

8. A method of confirming nuclear fuel inventories as claimed in claim 1, wherein the intensity of the Cerenkov radiation is measured with a hard film camera with ultra-violet transmitting lenses.

* * * * *